UNITED STATES PATENT OFFICE.

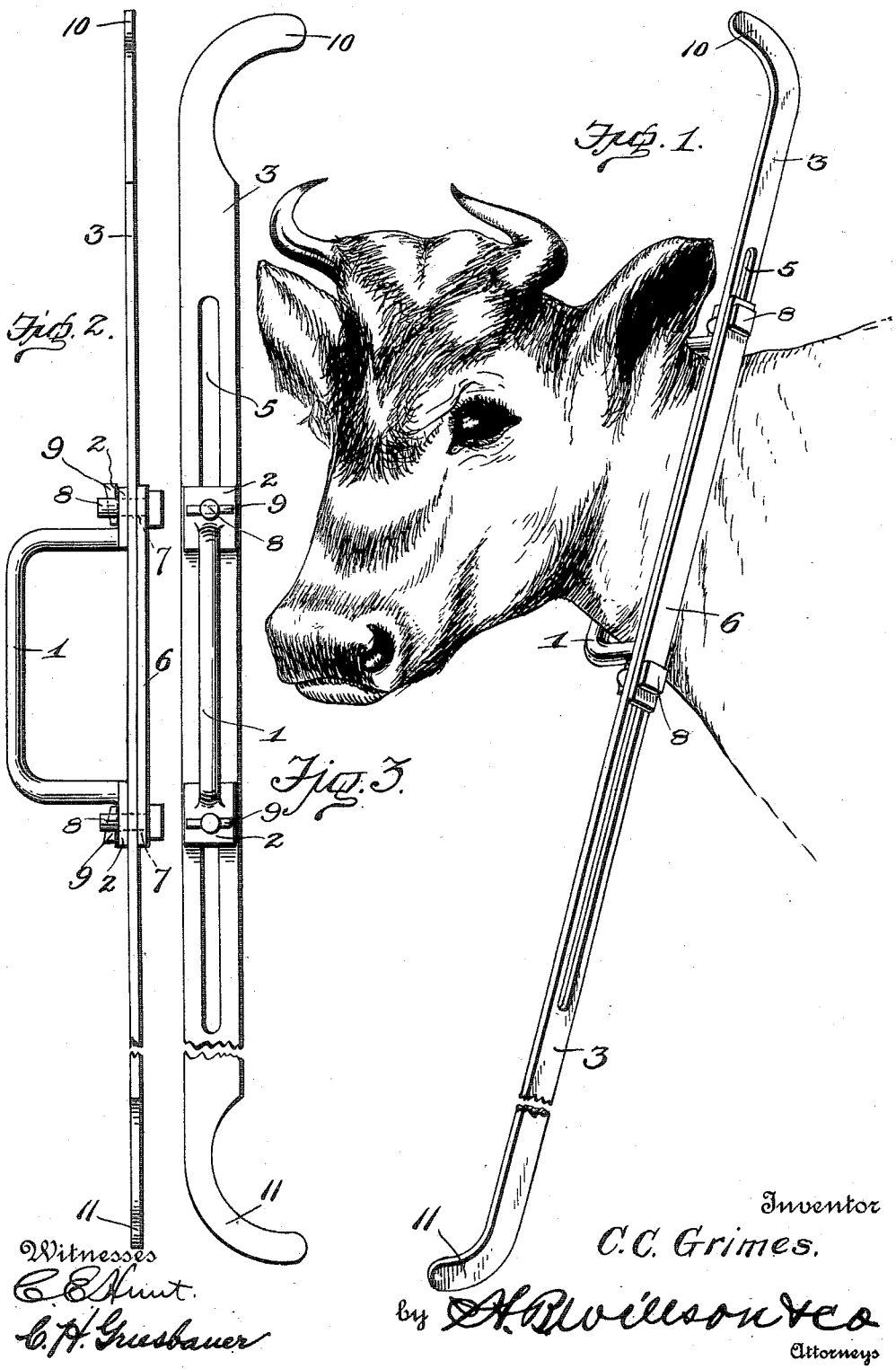

CALVIN C. GRIMES, OF NEWNAN, GEORGIA.

ANIMAL-POKE.

985,798.

Specification of Letters Patent.

Patented Mar. 7, 1911.

Application filed May 12, 1910. Serial No. 560,943.

*To all whom it may concern:*

Be it known that I, CALVIN C. GRIMES, a citizen of the United States, residing at Newnan, in the county of Coweta and State of Georgia, have invented certain new and useful Improvements in Animal-Pokes; and I do declare the following to be a full, clear, and exact description of the invention, such as will enable others skilled in the art to which it appertains to make and use the same.

This invention relates to improvements in animal pokes.

The object of the invention is to provide an animal poke having improved means for attaching the same to the neck of an animal and means whereby the poke may be adjusted.

With this and other objects in view, the invention consists of certain novel features of construction, combination and arrangement of parts as will be more fully described and particularly pointed out in the appended claims.

In the accompanying drawings: Figure 1 is a perspective view of a cow's head showing the application of the invention. Fig. 2 is a front view of the poke; Fig. 3 is a side view of the same.

My improved poke comprises a substantially U-shaped yoke I which is adapted to be engaged with the neck of an animal substantially as shown in Fig. 1 of the drawing. On the free ends of the legs of the member 1 are formed right angularly projecting outwardly extending apertured lugs 2. With the lugs 2 is slidably engaged a bar 3 having a longitudinally disposed slot 5 formed therein whereby said bar may be adjusted relatively to the yoke member 1 as hereinafter described. On the side of the bar 3 opposite the yoke 1 is engaged a clamping plate 6 having formed therein near its opposite ends bolt holes 7 through which are inserted clamping bolts 8 said bolts projecting through the slot 5 in the bar 3 and through the apertures in the lugs 2 of the yoke. In the ends of the bolts adjacent to the lugs 2 are formed transverse passages with which are engaged fastening pins or keys 9 whereby the clamping plates and lugs are drawn into tight engagement with the bar 3 and the latter thus adjustably secured to the yoke.

On the upper end of the bar 3 is formed a hook 10 and a similar hook 11 is preferably formed on the lower end of the bar said hooked ends of the yoke being adapted to catch into a fence or other obstruction and thus prevent the animal from jumping over or pushing its way through or between the same. By adjustably securing the bar to the yoke said bar may be adjusted to bring more or less of the upper or lower portion of the same above or below the yoke as may be desired.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim is:

1. In an animal poke, an attaching yoke, a longitudinally slotted bar, and means to adjustably connect said bar with said yoke to vary the extent of projection of the opposite ends in said bar.

2. In an animal poke, a substantially U-shaped yoke adapted to engage the neck of an animal, outwardly projecting laterally extending attaching lugs on the ends of said yoke, a longitudinally slotted bar, an apertured clamping plate adapted to be engaged with said bar, and clamping bolts extending through said plate and the slot in said bar and engaging the attaching lugs on said yoke for adjustably securing the bar to the yoke.

3. In an animal poke, an attaching yoke, apertured lugs extending outwardly from the ends of said yoke, a longitudinally slotted bar, a clamping plate for engagement with said bar having apertures arranged to register with the apertures in said lugs, bolts extending through said plate apertures and through the slot in said bar and the apertured lugs on said yoke whereby said parts are held together in adjustable engagement, and wedge-shaped locking pins extending through the ends of said bolts for securing the latter in position.

4. An animal poke comprising a substantially U-shaped yoke member having laterally extending outwardly projecting apertured lugs at the free ends thereof, a straight bar having a longitudinally extending slot therein for adjustable connection with said lugs and bolts extending through said slots and the apertures in said lugs for adjustably connecting said bar to said lugs.

In testimony whereof I have hereunto set my hand in presence of two subscribing witnesses.

CALVIN C. GRIMES.

Witnesses:
C. H. STAMPS,
W. L. STALLINGS.

Copies of this patent may be obtained for five cents each, by addressing the "Commissioner of Patents, Washington, D. C."